(12) United States Patent
Chopra et al.

(10) Patent No.: US 9,842,027 B1
(45) Date of Patent: Dec. 12, 2017

(54) INTELLIGENT APPLICATION OPTIMIZED BACKUPS

(71) Applicant: EMC Corporation, Hopkinton, MA (US)

(72) Inventors: Shelesh Chopra, Karnataka (IN); Rajkumar Madhukar Palkhade, Karnataka (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 171 days.

(21) Appl. No.: 14/142,578

(22) Filed: Dec. 27, 2013

(51) Int. Cl.
*G06F 17/30* (2006.01)
*G06F 11/14* (2006.01)

(52) U.S. Cl.
CPC .................. *G06F 11/1448* (2013.01)

(58) Field of Classification Search
CPC ........... G06F 171/1469; G06F 11/1458; G06F 11/1471
USPC ....... 707/661, 100, 827, 624, 770, 652, 651; 705/7.39; 711/162; 709/238, 219, 221, 709/224
See application file for complete search history.

(56) References Cited

U.S. PATENT DOCUMENTS

| | | | |
|---|---|---|---|
| 7,596,570 B1* | 9/2009 | Emigh et al. | |
| 8,495,315 B1* | 7/2013 | Rudolph | G06F 11/1458 711/162 |
| 8,560,639 B2* | 10/2013 | Murphy | G06F 11/1446 707/610 |
| 9,069,482 B1* | 6/2015 | Chopra | G06F 3/065 |
| 9,183,205 B1* | 11/2015 | Kurne | G06F 17/30073 |
| 9,210,183 B2* | 12/2015 | Sadovsky | H04L 63/1425 |
| 9,319,311 B2* | 4/2016 | Wang | H04L 45/306 |
| 2004/0128201 A1* | 7/2004 | Ofir et al. | 705/17 |
| 2005/0004928 A1* | 1/2005 | Hamer et al. | 707/100 |
| 2007/0136381 A1* | 6/2007 | Cannon | G06F 11/1451 |
| 2009/0043825 A1* | 2/2009 | Bourne | G06F 17/301 |
| 2009/0094271 A1* | 4/2009 | Brewer | G06F 17/30306 |
| 2009/0171706 A1* | 7/2009 | Bobak | G06Q 10/06 705/7.39 |
| 2010/0100620 A1* | 4/2010 | Sathish | H04W 8/22 709/224 |
| 2011/0271007 A1* | 11/2011 | Wang | H04L 45/306 709/238 |
| 2012/0117029 A1* | 5/2012 | Gold | G06F 11/1451 707/651 |
| 2012/0166483 A1* | 6/2012 | Choudhary | G06F 17/30545 707/770 |

(Continued)

*Primary Examiner* — Jeffrey A Burke
*Assistant Examiner* — Thong Vu
(74) *Attorney, Agent, or Firm* — Blakely, Sokoloff, Taylor & Zafman LLP

(57) ABSTRACT

A method by a backup application server for data backup. The method includes profiling a performance capability of a host that is to execute backup of data, profiling a property of the data, and sending the performance capability of the host and the property of the data to a rule engine module to determine a backup configuration parameter. The rule engine module includes pre-defined rules for determining a backup configuration parameter based on host performance capability and data property. The method further includes receiving the determined backup configuration parameter from the rule engine module and instructing the host to execute backup of the data to a backup storage using the determined backup configuration parameter.

16 Claims, 5 Drawing Sheets

(56) References Cited

U.S. PATENT DOCUMENTS

| | | | |
|---|---|---|---|
| 2012/0284712 A1* | 11/2012 | Nimmagadda | G06F 9/5077 718/1 |
| 2012/0331248 A1* | 12/2012 | Kono | G06F 11/1448 711/162 |
| 2013/0006943 A1* | 1/2013 | Chavda | G06F 11/1448 707/652 |
| 2013/0036091 A1* | 2/2013 | Provenzano | G06F 17/30162 707/624 |
| 2013/0124807 A1* | 5/2013 | Nielsen | G06F 11/1438 711/162 |
| 2014/0074869 A1* | 3/2014 | Petrone | G06F 17/301 707/755 |
| 2014/0181048 A1* | 6/2014 | Varadharajan et al. | 707/661 |
| 2014/0189685 A1* | 7/2014 | Kripalani | G06F 8/65 718/1 |
| 2015/0088940 A1* | 3/2015 | Stokely | G06F 17/30194 707/827 |
| 2015/0172120 A1* | 6/2015 | Dwarampudi | G06F 3/06 709/221 |

* cited by examiner

501

| HOST NAME | SIZE OF DB TO BE BACKED UP IN GB | PHYSICAL MEMORY | |
|---|---|---|---|
| A | 1000 GB | 8 GB | 502 |
| B | 70 GB | 8 GB | 504 |
| C | 3 GB | 4 GB | 506 |

| PROPERTY NAME | FLAG | SIZE OF DB TO BE BACKED UP IN GB | PHYSICAL MEMORY | RECOMMENDED VALUE FOR STRIPES | |
|---|---|---|---|---|---|
| Multi Stripes | -S | 5 GB | 4 GB | No Striping | 508 |
| Multi Stripes | -S | 5 GB - 25 GB | 4 GB | 4 | 510 |
| Multi Stripes | -S | 5 GB - 25 GB | 8 GB | 12 | 512 |
| Multi Stripes | -S | 25 GB - 250 GB | 4 GB | 8 | 514 |
| Multi Stripes | -S | 25 GB - 250 GB | 8 GB | 16 | 516 |
| Multi Stripes | -S | > 250 GB | 4 GB | 16 | 518 |
| Multi Stripes | -S | > 250 GB | 8 GB | 32 | 520 |

| HOST NAME | SIZE OF DB TO BE BACKED UP IN GB | PHYSICAL MEMORY | RECOMMENDED STRIPES | |
|---|---|---|---|---|
| A | 1000 GB | 8 GB | 32 | 522 |
| B | 70 GB | 8 GB | 16 | 524 |
| C | 3 GB | 4 GB | No Stripes | 526 |

FIG. 5C

INTELLIGENT APPLICATION OPTIMIZED BACKUPS

TECHNICAL FIELD

The embodiments of the invention relate to a method and system for data backup. Specifically, the embodiments of the invention relate to a method and system for optimizing data backup by dynamically configuring backup parameters.

BACKGROUND

Fast and efficient data backup is becoming increasingly important as the amount of data stored in data centers continually increase and as more and more people depend on data being available when needed. However, as the amount of data increases, backup performance may suffer. Backup applications have evolved to facilitate faster backups using techniques such as multi-streaming, block copies, snapshot awareness, federated backups, cluster aware backups, backups from proxy hosts, probe based backups, and other techniques to increase the speed and efficiency of backups.

Certain techniques and settings for data backup may work better depending on the performance capabilities of the host that is to perform the backup and the properties of the data to be backed up. A backup administrator can manually select the data backup techniques and settings that are well suited for a particular host and data set to improve backup speed. However, often times, the backup administrator does not know which settings to use to optimize the backup speed for a particular data set. As a result, often times, backup administrators configure data backup settings based on gut feeling or even by random selection. There are many instances where a different backup configuration setting from the setting manually selected by the backup administrator could have resulted in faster and more efficient backup.

SUMMARY

A method is described to be implemented by a backup application server. The method includes profiling a performance capability of a host that is to execute backup of data, profiling a property of the data, and sending the performance capability of the host and the property of the data to a rule engine module to determine a backup configuration parameter. The rule engine module includes pre-defined rules for determining a backup configuration parameter based on host performance capability and data property. The method further includes receiving the determined backup configuration parameter from the rule engine module and instructing the host to execute backup of the data to a backup storage using the determined backup configuration parameter.

A computer system is described comprising a processor, an analyzer module executed by the processor to determine a performance capability of a host that is to perform backup of data and to determine a property of the data to be backed up, a rule engine module executed by the processor to determine a backup configuration parameter to use for data backup based on pre-defined rules stored in a lookup table, the pre-defined rules associating host performance capability and data property with a value for a backup configuration parameter, and a backup module executed by the processor to cause the host to execute backup of the data to a backup storage using the determined backup configuration parameter.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

FIG. 5A illustrates a table that displays the performance capability of three different hosts and the size of the database that each host is assigned to back up.

FIG. 5B illustrates an example of a lookup table that may be used by rule engine module to dynamically determine backup configuration parameters.

FIG. 5C illustrates a table that displays the recommended number of stripes for three different hosts as determined by a rule engine.

DETAILED DESCRIPTION

Figure 1:
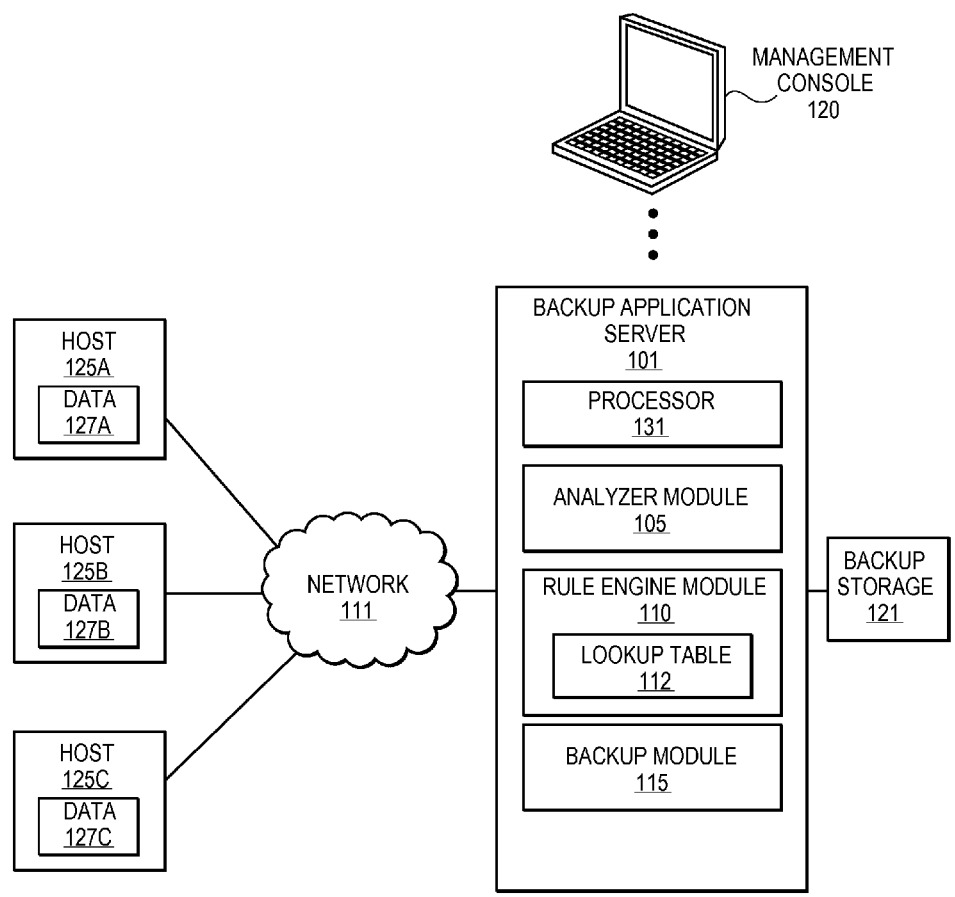
FIG. 1 is a diagram of one embodiment of a system implementing data backup using a dynamic data backup configuration parameter.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present invention.

In the description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. A 'set,' as used herein refers to any positive whole number of items including one item. Where possible, any terms expressed in the singular form herein are meant to include the plural form and vice versa, unless explicitly stated otherwise. Data that is 'received' or 'forwarded' by a component can be received by network transmission, a local read or write operation, a system call or similar process for passing data between components of a computer system or over a network.

When an element is referred to as being "connected," "coupled," "responsive," or variants thereof to another element, it can be directly connected, coupled, or responsive to the other element or intervening elements may be present. In contrast, when an element is referred to as being "directly connected," "directly coupled," "directly responsive," or variants thereof to another element, there are no intervening elements present. Like numbers refer to like elements throughout. Furthermore, "coupled," "connected," "responsive," or variants thereof as used herein may include wirelessly coupled, connected, or responsive. As used herein, the singular forms "a," "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise," "comprising," "comprises," "include," "including," "includes," "have," "has," "having," or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.," which derives from the Latin phrase "exempli gratia," may be used to introduce or specify a general example or examples of a previously mentioned item, and is not intended to be limiting of such item. The common abbreviation "i.e.," which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible non-transitory computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-Ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof. Embodiments of the present invention are not described with reference to any particular programming language. It will be appreciated that a variety of programming languages may be used to implement the teachings of embodiments of the invention as described herein.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

FIG. 1 is a diagram of one embodiment of a system implementing data backup using a dynamic data backup configuration parameter. The system includes a set of hosts, 125A-125C connected through a network 111 to a backup application server 101. The hosts 125A-125C can be any type of computer systems including servers, desktops, desktop computers, handheld computers, work stations and similar computer systems. Each of the hosts 125A-125C can be separately controlled or can be within the control of the same organization or administrators. The host 125A-125C can be controlled or administered by the same organization as the backup application server 101 or can be separately owned and administered from the backup application server 101 where the backup application server 101 is provided by an external vendor or provider.

The host data 127A-127C stored within the hosts 125A-125C can be any type and variety of data including documents, images, databases and other types of data sets as well as any combination thereof. These data sets 127A-127C can be accessed and transferred to the backup application server 101 to be stored in the backup storage 121. This transfer is performed primarily by the backup module 115. The hosts 125A-125C, in one embodiment, can also include a set of local clients that coordinate with the backup module 115 and the backup application server 101 to effect the transfer of the data sets 127A-127C.

The hosts 125A-125C can be connected to the backup application server 101 and backup storage over a network 111. The network 111 can be any type of network including a local area network (LAN), a wide area network (WAN), such as the Internet or similar network. Further, the hosts 125A-125C can be connected through multiple networks to the backup application server 101. The network 111 can encompass any combination of wired or wireless communication mediums and can encompass any number of intermediate computing and network devices.

The backup storage 121 can be any type of storage device or array of storage devices or set of servers containing such devices. The storage devices may include magnetic storage discs, optical storage discs, solid state memories and similar storage technology devices. The backup storage 121 can be local or separate from the backup application server 101. Backup storage 121 can be connected to backup application server 101 by any type of network or data connection.

The backup application server 101 can be implemented as a server or set of servers executing each of the modules therein including an analyzer module 105, rule engine module 110, and backup module 115. Those skilled in the art would understand that the modules are an organization of the backup application server 101 and are provided by way of example and not limitation and that other organizations of the functions and modules are possible and they could be distributed over any number of individual servers, processors or similar hardware components. The backup application server 101 can incorporate any number of processors 131 or processing devices that are within a single server or a set of servers that implement the backup application server 101. These processors 131 execute the modules of the backup application server 101, which can be stored in the local memory of a local storage device and executed by the processors 131 in combination with working memory and similar resources within the backup application server 101. In some embodiments, backup application server 101 is a server running EMC Networking backup and recovery software available from EMC Corporation of Hopkinton, Mass.

Backup application server may be configured and controlled by a user via a management console 120. Management console 120 provides the user with a user interface to manage and control operations of the backup application server 101. Management console 120 may be directly connected to backup application server 101 or connected to backup application server 101 through a network or multiple networks. Management console 120 can by any type of computing device such as workstation, personal computer, laptop, mobile device, virtual machine, or any combination thereof.

The analyzer module 105 is capable of profiling performance capability of a host 125A-125C. Performance capability as used herein refers to any static and dynamic properties of a host machine that is related to computing performance. For example, performance capability of a host 125A-125C may include, but is not limited to, CPU speed of the host 125A-125C, the number of processor cores of the host 125A-125C, and the amount of physical memory of the host 125A-125C. Furthermore, performance capability may also include dynamic properties such as the current CPU utilization of the host 125A-125C and the current amount of physical memory available to the host 125A-125C. Analyzer module 105 may capture performance capability of a host 125A-125C through remote execution of the host 125A-125C over network 111 or by similar means.

The analyzer module 105 is also capable of profiling various properties of data 127A-127C to be backed up. The data 127A-127C to be backed up can be any type and variety of data including documents, images, databases and other types of data sets as well as any combination thereof. Properties of the data 127A-127C to be backed up may include, but is not limited to, size of the data and type of data. In one embodiment, analyzer module 105 may profile the size of a SQL database stored in host 125A-125C. In another embodiment, analyzer module 105 may profile the number of SQL databases in a data set 127A-127C. Analyzer module 105 may capture properties of the data 127A-127C to be backed up through remote execution of the host 125A-125C that stores the data 127A-127C over network 111 or by similar means.

The rule engine module 110 contains a set of rules for determining a backup configuration parameter to use for data backup based on performance capability of the host 125A-125C and properties of the data 127A-127C to be backed up. Backup configuration parameter is a configurable setting that is used by the host 125A-125C and/or backup application server 101 when executing data backup. For example, a backup configuration parameter can indicate the number of stripes to use for the backup. In another embodiment, backup configuration parameter can indicate whether to use compression and/or de-duplication for the backup. In a further embodiment, backup configuration parameter can indicate what type of compression to use for backup. Rule engine module 110 may consult a lookup table 112 to select a backup configuration parameter to use for data backup. Lookup table 112 may be a table stored within rule engine module 110 of backup application server 101. In another embodiment lookup table 112 may be stored in a separate database that is accessible by rule engine module 110 over network 111. Lookup table 112 contains entries that recommend backup configuration parameters based on performance capability of a host 125A-125C and properties of the data 127A-127C to be backed up. Rule engine module 110 may communicate with analyzer module 105 to obtain performance capability of a host 125A-125C and/or properties of the data 127A-127C to be backed up. Lookup table 112 can be modified by a user (e.g., backup administrator) to create custom rules and/or to modify existing rules for selecting backup configuration parameters.

The backup module 115 can communicate with the hosts 125A-125C using any type of communication protocol to effect the transfer of the data sets, 127A-127C to backup storage 121. In one embodiment, hosts 125A-125C can also include a set of local clients that coordinate with backup module 115 and the backup application server 101 to effect the transfer of data sets 127A-127C to backup storage 121. Backup module 115 can configure a host 125A-125C to apply various data backup techniques and settings when effecting backup of data sets 127A-127C to backup storage 121. For example backup module 115 can be configured to instruct a host 125A-125C to execute striped backup or apply compression and/or de-duplication to the data 127A-127C to be backed up. In one embodiment, data backup can be configured using a backup configuration parameter.

Figure 2:
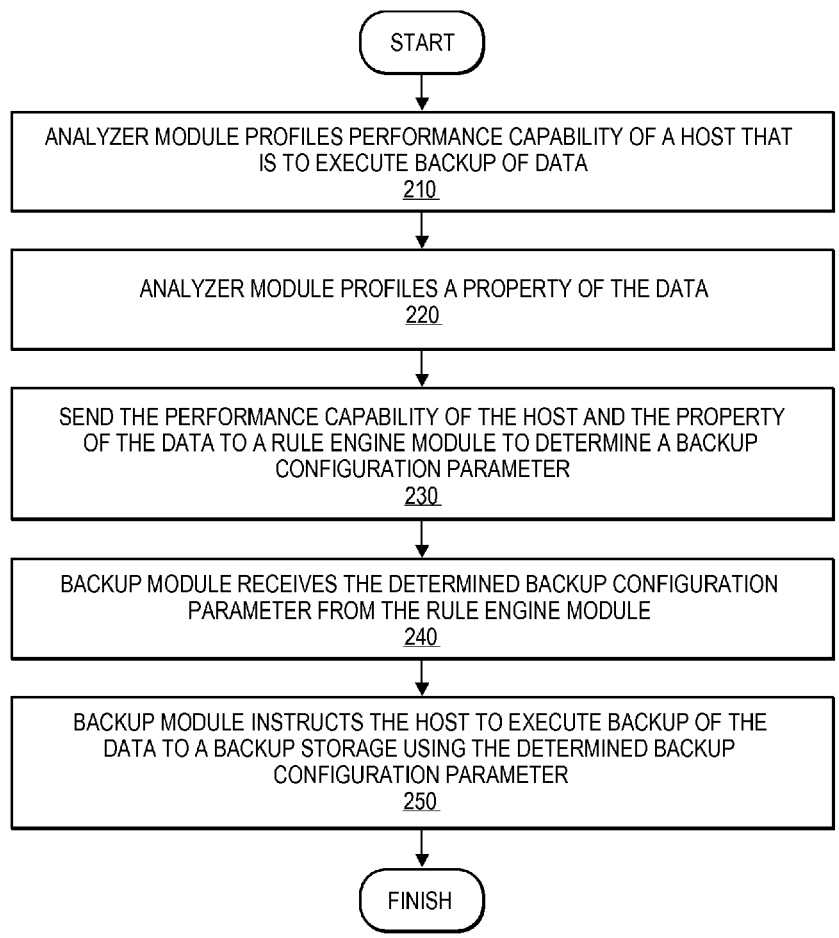
FIG. 2 is flowchart of one embodiment of a method for performing data backup using a dynamic backup configuration parameter.

FIG. 2 is flowchart of one embodiment of a method for performing data backup using a dynamic backup configuration parameter. The method may be performed by various modules of the backup application server 101, which may be implemented as processing logic in software, hardware, or a combination thereof.

The method starts by analyzer module 105 profiling the performance capability of a host 125A-125C that is to execute backup of data 127A-127C (Block 210). The host 125A-125C may be any computer system that is capable of transferring data to a backup storage 121. Performance capability of the host 125A-125C can include, but is not limited to, CPU speed of the host, physical memory of the host, CPU utilization of the host, and available physical memory of the host. Analyzer module 105 may capture performance capability of a host 125A-125C through remote execution of the host 125A-125C or by similar means.

The analyzer module 105 also profiles a property of the data 127A-127C to be backed up (Block 220). The data 127A-127C to be backed up may be stored in memory of the host 125A-125C or other storage device that is accessible by the host 125A-125C. Property of the data can include, but is not limited to, the size of the data to be backed up and the type of data to be backed up. Analyzer module 105 may capture properties of the data 127A-127C to be backed up through remote execution of the host 125A-125C that stores the data or by similar means.

The performance capability of the host 125A-125C and the property of the data 127A-127C are sent to rule engine module 110 to determine a backup configuration parameter (Block 230). The rule engine module 110 includes predefined rules for determining a backup configuration parameter based on host performance capability and data property. Backup configuration parameter can include, but is not limited to, the number of stripes to use for data backup, whether compression should be used for data backup, whether de-duplication should be used for data backup, and other configurable settings for data backup. In one embodiment, rule engine module 110 contains a lookup table 112 that associates host performance capability and data property with a backup configuration parameter. An example of a lookup table 112 that may be used by rule engine module 110 according to an embodiment of the present invention is described in further detail herein below with reference to FIG. 4A.

The backup module 115 receives the backup configuration parameter from the rule engine module 110 (Block 240) and instructs the host 125A-125C to back up the data 127A-127C to data storage 121 using the determined backup configuration parameter (Block 250). The host 125A-125C can then effect transfer of data 127A-127C to the backup storage 121 using the determined backup configuration parameter.

A more specific embodiment of the systems, components, and processes described above will now be described to illustrate the present invention. For simplicity and clarity of illustration, the following examples illustrate dynamically configuring the number of stripes to use for backup of a SQL database. However, one of ordinary skill in the art will understand that the present invention can be modified to backup other types of data and to dynamically configure other backup configuration parameters without departing from the spirit and scope of the present invention.

Striped backup backs up a database into multiple stripes. Stripes are streams of data that may be extracted, in parallel, from a database, and written in parallel to one or more storage devices. Striped backup can lead to faster backup performance especially when the database to be backed up is large in size. However, striped backup does not always lead to faster backup performance. For example, for smaller databases, using stripes may result in suboptimal performance. For smaller databases, using a small number of stripes or not using stripes may result in better backup performance. For larger data sets, in general, increasing the number of stripes leads to better backup performance. Also, striped backup may not be desirable if CPU speed is a gating factor because striped backup consumes more CPU processing power than non-striped backup.

Figure 3:
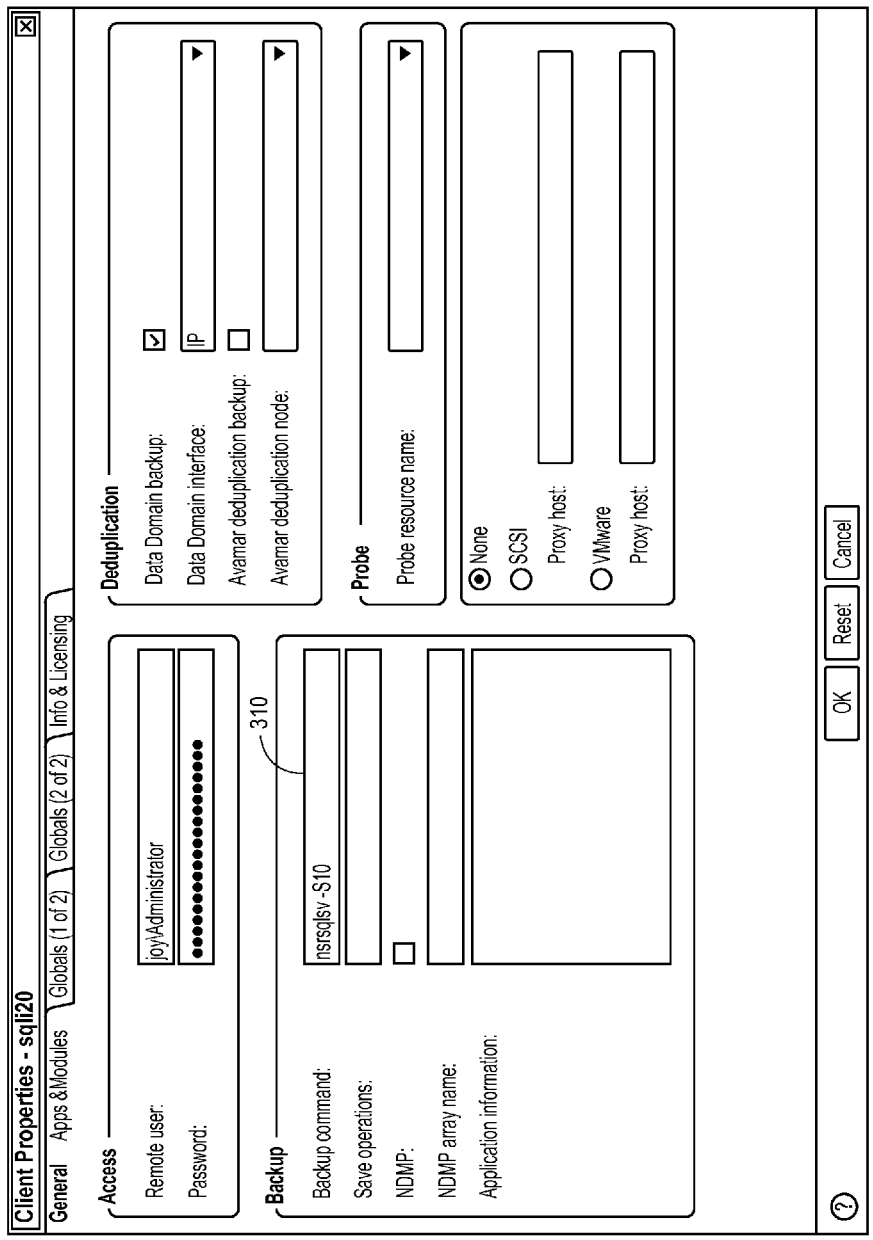
FIG. 3 is a screenshot of an exemplary user interface showing manual configuration of a backup configuration parameter.

FIG. 3 is a screenshot of an exemplary user interface showing manual configuration of a backup configuration parameter. The user interface may be displayed on management console 120 to allow a user to control operation of backup application server 101. The user interface allows a user to enter a backup command followed by desired backup configuration parameters in the backup command field 310. FIG. 3 shows that a user entered backup command, "nsrsqlsv" in the backup command field 310 followed by backup configuration parameter "-S10," indicating that the backup of the SQL database should be performed using 10 stripes. Often times, the user does not know the number of stripes that will result in optimal backup performance so the user selects the number of stripes based on gut feeling or by random selection. As a result, the user may select a number of stripes that results in poor backup performance.

Figure 4:
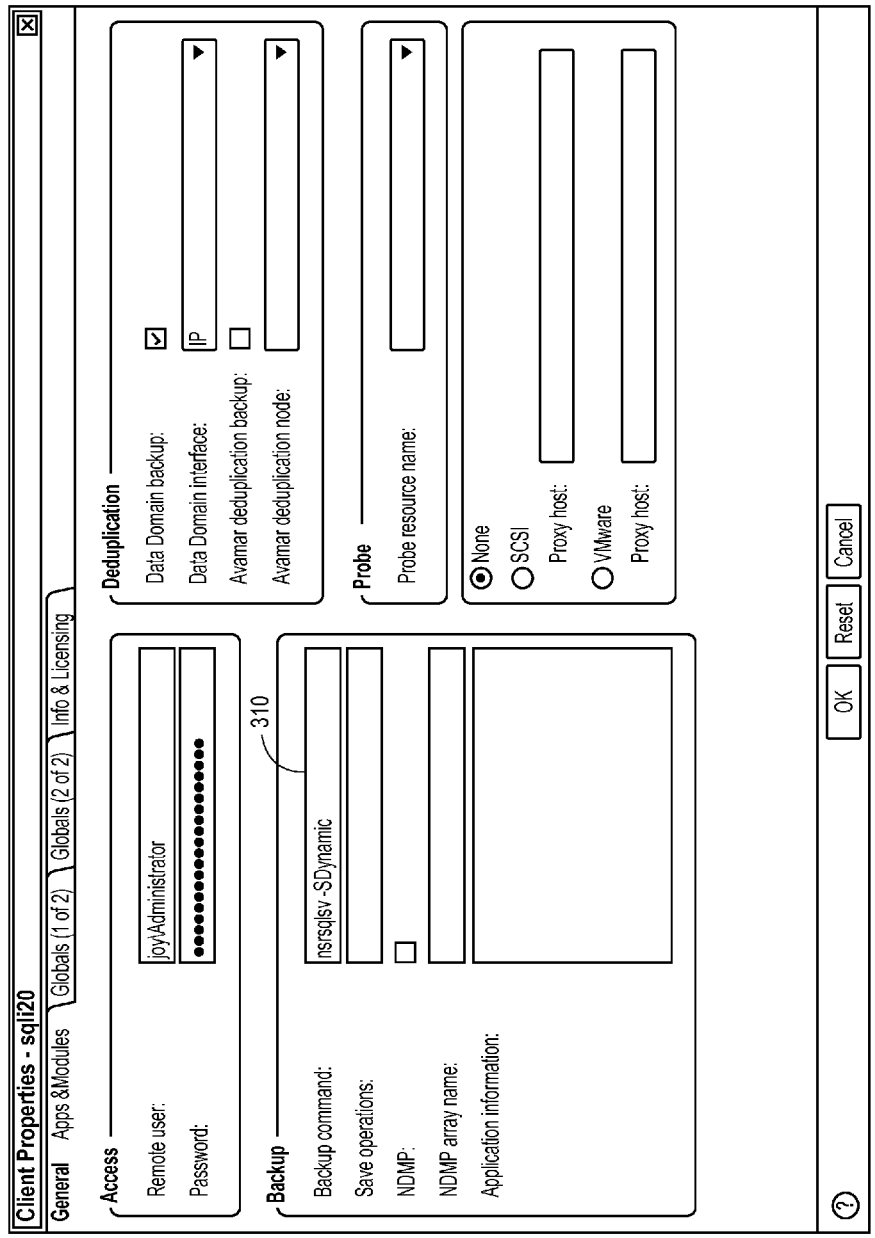
FIG. 4 is screenshot of an exemplary user interface showing dynamic configuration of a backup configuration parameter.

FIG. 4 is screenshot of an exemplary user interface showing dynamic configuration of a backup configuration parameter. Similar to FIG. 3, the user enters a backup command, "nsrsqlsv," followed by a desired backup configuration parameter in the backup command field 310. However, instead of hard-coding the number of stripes to use for data backup as described above with reference to FIG. 3, the user enters a backup configuration parameter of "-SDynamic" indicating that the number of stripes to use for backup of the SQL database should be dynamically determined at run time. Thus, instead of having the user manually select the number of stripes to use for data backup, the backup application server 101 can intelligently and dynamically select the number of stripes to use for data backup based on information about the performance capability of the host 125A-125C and the properties of the data 127A-127C using the process described above or similar process to improve backup performance.

FIG. 5A illustrates a table 501 that displays the performance capability of hosts A, B, and C, and the size of the database that each host is assigned to back up. Host A has physical memory of 8 GB and is assigned to back up a database that is 1000 GB in size. Host B has physical memory of 8 GB and is assigned to back up a database that is 70 GB in size. Host C has physical memory of 4 GB and is assigned to back up a database that is 3 GB in size. In one embodiment, analyzer module 105 can capture the physical memory of the host and the size of the database to be backed up using remote execution of the host. In other embodiments, analyzer module 105 may capture other performance capabilities of the host and other properties of the database.

FIG. 5B illustrates an example of a lookup table 112 that may be used by rule engine module 110 to dynamically determine backup configuration parameters. In one embodiment, lookup table 112 has columns for property name, flag, size of database to be backed up, physical memory, and recommended value for stripes. The parameter name column contains a short description of the backup configuration parameter for the entry. For example, an entry for determining the number of stripes has a parameter name column value of "multi stripes." The flag column contains the flag for setting a backup configuration parameter. For example, the flag to set the number of stripes to be used for data backup is "-S." The lookup table 112 provides a recommended value for the number of stripes based on the size of the database to be backed up and the physical memory of the host 125A-125C. For example, entry 508 of lookup table 112 indicates that if the size of the database to be backed up is less than 5 GB and the physical memory of the host 125A-125C is 4 GB, then striping should not be used. In another example, entry 512 of lookup table indicates that if the size of the database is between 5 GB and 25 GB and the physical memory of the host 125A-125C is 8 GB, then backup should be performed using 12 stripes. In one embodiment, the lookup table 112 can have an entry for the default number of stripes to use in the case that the performance capability of the host 125A-125C and the property of the data 127A-127C do not match any of the entries in lookup table 112.

In one embodiment, a single lookup table 112 can be stored in rule engine module 110 to be used for data backup of all hosts 125A-125C managed by backup application server 101. In another embodiment, lookup table 112 can be maintained in a database that is accessible by rule engine module 110 over network 111, separate from rule engine module 110 and the backup application server 101. In a further embodiment, each host 125A-125C can maintain its own local lookup table 112.

FIG. 5C illustrates a table 521 that displays the recommended number of stripes for hosts A, B, and C as determined by rule engine module 110. Rule engine module 110 consults lookup table 112 to determine how many stripes should be used for data backup based on information about the size of the database to be backed up and the physical memory of the host 125A-125C provided by analyzer module 105. Host A is assigned to back up a database that is larger than 250 GB (i.e., 1000 GB) and has physical memory of 8 GB and thus matches entry 520 in lookup table 112. Entry 520 in lookup table 112 recommends that backup be performed using 32 stripes. In a similar fashion, host B is assigned to back up a database that is between 25 GB and 250 GB in size and has physical memory of 8 GB and thus matches entry 516 of lookup table 112. Entry 516 in lookup table 112 recommends that backup be performed using 16 stripes. In a similar fashion, host C is assigned to back up a database that is less than 5 GB in size and has physical memory of 4 GB and thus matches entry 508 of lookup table 112. Entry 508 in lookup table 112 recommends that striping should not be used for data backup. The backup application server 101 then instructs each host 125A-125C to execute backup of its database to the backup storage 121 using the number of stripes recommended by rule engine module 110. Based on this example, backup application server 101 would instruct host A to back up its assigned database using 32 stripes, host B to back up its assigned database using 16 stripes, and host C to back up its assigned database without using stripes. Each host 125A-125C then executes backup of its database to data storage 121 using the number of stripes recommended by rule engine module 110.

Although the specific examples described in the present disclosure focus mostly on backup of SQL databases using stripes, one of ordinary skill in the art will understand that the methods, systems, and functionality described herein can be modified to apply to other types of data and other backup configuration parameters.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method by a backup application server comprising:

profiling by an analyzer module running within the backup application server a performance capability of a host that is to back up data, wherein the host is a source storage system that backs up data to a target storage system, and wherein the performance capability of the host includes one or more static or dynamic properties of the host machine that is related to computing performance, and wherein the performance capability of the host further includes a size of data that can be backed up by the host and an amount of memory that can be allocated by the host to back up the data;

profiling by the analyzer module a property of the data, wherein the property of the data includes the size of the data to be backed up and a type of data to be backed up;

sending the performance capability of the host and the property of the data to a rule engine module to determine a backup configuration parameter, the rule engine module including pre-defined rules for determining a backup configuration parameter based on host performance capability and data property, wherein the pre-defined rules of the rule engine module are stored in a lookup table having a plurality of mapping entries, each mapping entry mapping host performance capability and data property of each host to a recommended backup configuration parameter, and the lookup table can be modified by a backup administrator to create custom rules and/or to modify existing rules, wherein the backup configuration parameter includes a number of stripes to be used to back up data, whether compression should be applied to back up data, or whether deduplication should be performed on the data;

receiving by a backup module the determined backup configuration parameter from the rule engine module; and transmitting by the backup module the backup configuration parameter to the host to instruct the host to back up the data from the host to a backup storage over a network using the determined backup configuration parameter.

2. The method of claim 1, wherein the performance capability of the host includes any one of CPU speed of the host, a number of processor cores of the host, an amount of physical memory of the host, CPU utilization of the host, or an amount of available physical memory of the host.

3. The method of claim 1, wherein the data is data in a SQL database.

4. The method of claim 3, wherein the property of the data is a number of SQL databases to be backed up.

5. The method of claim 1, wherein the backup configuration parameter is a number of stripes to use for data backup.

6. The method of claim 1, wherein the backup configuration parameter is an indicator of whether deduplication should be performed for data backup.

7. The method of claim 1, wherein the backup configuration parameter is an indicator of whether compression should be used for data backup.

8. A non-transitory computer-readable storage medium having instructions stored therein, which when executed cause a computer to perform a set of operations for data backup comprising:

profiling a performance capability of a host that is to execute backup of a data set, wherein the host is a source storage system that backs up data to a target storage system, and wherein the performance capability of the host includes one or more static or dynamic properties of the host machine that is related to computing performance, and wherein the performance capability of the host further includes a size of data that can be backed up by the host and an amount of memory that can be allocated by the host to back up the data;

profiling a property of the data set, wherein the property of the data set includes the size of the data set to be backed up and a type of data set to be backed up;

determining a backup configuration parameter to use for data backup based on the performance capability of the host and the property of the data set, wherein the backup configuration parameter to be used for data backup is determined by querying a lookup table having a plurality of mapping entries, each mapping entry mapping host performance capability and data property of each host to a recommended backup configuration parameter, and the lookup table can be modified by a backup administrator to create custom rules and/or to modify existing rules, wherein the backup configuration parameter includes a number of stripes to be used to back up data, whether compression should be applied to back up data, or whether deduplication should be performed on the data; and transmitting the backup configuration parameter to the host to instruct the host to execute backup of the data set by backing up the data set from the host to a backup storage over a network using the determined backup configuration parameter.

9. The non-transitory computer-readable storage medium of claim 8, wherein the performance capability of the host includes any one of CPU speed of the host, a number of processor cores of the host, an amount of physical memory of the host, CPU utilization of the host, or an amount of available physical memory of the host.

10. The non-transitory computer-readable storage medium of claim 8, wherein the data set is data in a SQL database.

11. The non-transitory computer-readable storage medium of claim 10, wherein the property of the data set is a number of SQL databases to be backed up.

12. The non-transitory computer-readable storage medium of claim 8, wherein the backup configuration parameter is a number of stripes to use for data backup.

13. The non-transitory computer-readable storage medium of claim 8, wherein the backup configuration parameter is an indicator of whether deduplication should be performed for data backup.

14. The non-transitory computer-readable storage medium of claim 8, wherein the backup configuration parameter is an indicator of whether compression should be used for data backup.

15. A computer system comprising:
a processor;
an analyzer module executed by the processor to determine a performance capability of a host that is to perform backup of data and to determine a property of the data to be backed up, wherein the host is a source storage system that backs up data to a target storage system, wherein the performance capability of the host includes one or more static or dynamic properties of the host machine that is related to computing performance, and wherein the property of the data includes the size of the data to be backed up and a type of data to be backed up, and wherein the performance capability of the host further includes a size of data that can be backed up by the host and an amount of memory that can be allocated by the host to back up the data;
a rule engine module executed by the processor to determine a backup configuration parameter to use for data backup, the rule engine module including pre-defined rules for determining the backup configuration parameter based on host performance capability and data property, wherein the pre-defined rules of the rule engine module are stored in a lookup table having a plurality of mapping entries, each mapping entry mapping host performance capability and data property of each host to a recommended backup configuration parameter, and the lookup table can be modified by a backup administrator to create custom rules and/or to modify existing rules, wherein the backup configuration parameter includes a number of stripes to be used to back up data, whether compression should be applied to back up data, or whether deduplication should be performed on the data; and
a backup module executed by the processor to transmit the backup configuration parameter to the host to cause the host to execute backup of the data by backing up the data from the host to a backup storage over a network using the determined backup configuration parameter.

16. The system of claim 15, wherein the performance capability of the host includes any one of CPU utilization of the host or available physical memory of the host.

* * * * *